(12) United States Patent
Nelson

(10) Patent No.: US 7,812,850 B1
(45) Date of Patent: Oct. 12, 2010

(54) EDITING CONTROL FOR SPATIAL DEFORMATIONS

(75) Inventor: John Nelson, Normandy Park, WA (US)

(73) Assignee: Adobe Systems Incorporated, San Jose, CA (US)

( * ) Notice: Subject to any disclaimer, the term of this patent is extended or adjusted under 35 U.S.C. 154(b) by 600 days.

(21) Appl. No.: 11/771,726

(22) Filed: Jun. 29, 2007

(51) Int. Cl.
G09G 5/00 (2006.01)
G06T 17/00 (2006.01)
G06T 15/30 (2006.01)

(52) U.S. Cl. .................. 345/619; 345/646; 345/647; 345/420; 345/423

(58) Field of Classification Search .................. 345/619, 345/629, 646, 647, 420, 423
See application file for complete search history.

(56) References Cited

U.S. PATENT DOCUMENTS

| | | | |
|---|---|---|---|
| 6,573,889 B1 | 6/2003 | Georgiev | |
| 6,608,631 B1 * | 8/2003 | Milliron | 345/647 |
| 7,102,652 B2 | 9/2006 | O'Donnell et al. | |
| 7,103,236 B2 | 9/2006 | Peterson | |
| 7,113,187 B1 * | 9/2006 | Kikinis | 345/629 |
| 7,385,612 B1 * | 6/2008 | Peterson | 345/619 |
| 2006/0038832 A1 * | 2/2006 | Smith et al. | 345/646 |
| 2008/0150962 A1 * | 6/2008 | Bezryadin et al. | 345/619 |

OTHER PUBLICATIONS

Kai's Power Goo, Encyclopedia of Science Fiction and SimuWeb and SimuNet, Cyber News and Reviews, web page at http://www.cyber-reviews.com/oct96.html, as available via the Internet and printed Feb. 12, 2008.

Newcomb, M., Mini-Reviews, web page available at http://www.miken.com/winpost/sep96/minirev.htm, as available via the Internet and printed Feb. 12, 2008.

* cited by examiner

*Primary Examiner*—Chante Harrison
(74) *Attorney, Agent, or Firm*—Kilpatrick Stockton LLP

(57) ABSTRACT

Systems, methods, and computer readable media for editing controls for spatial deformations are described. One embodiment includes a method including the steps of causing an image having at least one unmodified object to be displayed in a window, receiving a deformation of the unmodified object, generating a deformed object based at least in part on the deformation and the unmodified object, and causing the deformed object to be displayed in the window. The method further includes the steps of causing a representation of the unmodified object to be displayed in the window with the deformed object, receiving a selection of a point within the representation of the unmodified object, receiving a modification of a first parameter associated with the unmodified object at the point, regenerating the deformed object based at least in part on the deformation, the unmodified object, and the modified first parameter, and causing the regenerated deformed object to be displayed in the window.

28 Claims, 18 Drawing Sheets

EDITING CONTROL FOR SPATIAL DEFORMATIONS

FIELD OF THE INVENTION

The present invention generally relates to editing graphical images, and more specifically relates to spatial deformation of objects in images.

BACKGROUND

Two-dimensional and three-dimensional electronic images may be edited using conventional computer-based image editing tools. For example, a two-dimensional object in an image may be deformed to create successive image frames for use in an animated video. Conventional deformation tools use multiple windows to allow a user to deform a portion of an original image and to view the results of the deformation. For example, a conventional deformation tool for two-dimensional images allows a user to deform an object or objects that make up the image in one window, and to view the resulting deformed objects in the image in a second window. In a conventional deformation tool for three-dimensional images, a user may be presented with four or more windows: one each for deforming the unmodified image in the X, Y, and Z axes, and a fourth in which the deformed image is shown. In such conventional deformation tools, a user must repeatedly shift their focus between multiple windows and multiple representations of the image, a problem referred to as "edit this, look at that" or ETLAT. In addition, the use of multiple windows can significantly reduce the available screen space for the display of the deformed image, or other representations of interest to the user.

SUMMARY

Embodiments of the present invention provide methods and systems for editing controls for spatial deformations. For example, in one illustrative embodiment, a method for deforming an image comprises causing an unmodified image to be displayed in a window, receiving a deformation of the unmodified image, generating a deformed image based at least in part on the deformation and the unmodified image, and causing the deformed image to be displayed in the window. This illustrative method further comprises causing a representation of the unmodified image to be displayed in the window with the deformed image, receiving a selection of a point within the representation of the unmodified image, receiving a modification of a first parameter associated with the unmodified image at the point, regenerating the deformed image based at least in part on the deformation, the unmodified image, and the first parameter, and causing the regenerated deformed image to be displayed in the window. In another embodiment, a computer-readable medium comprises program code for carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
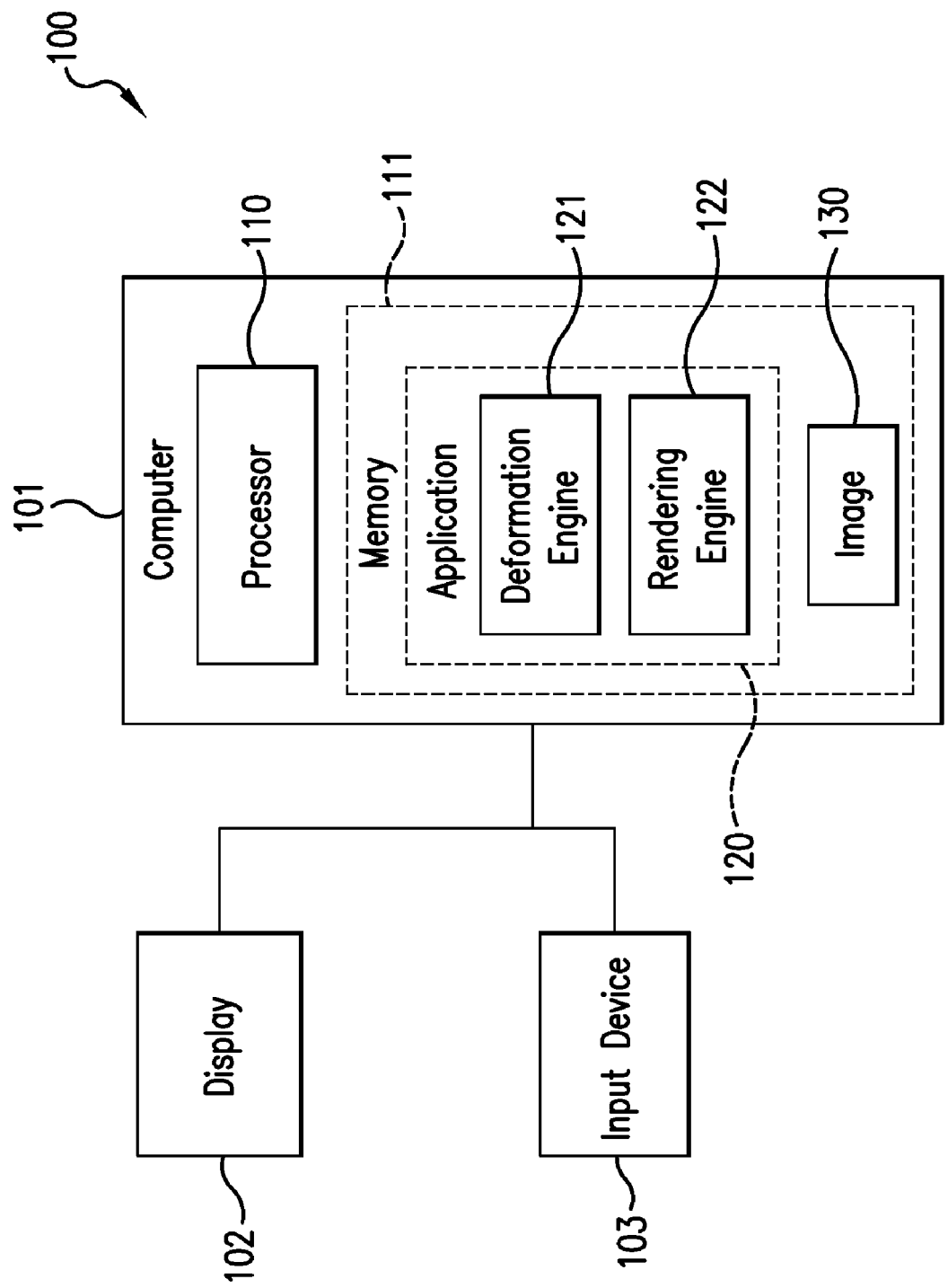
FIG. 1 shows a system for editing an image according to one embodiment of the present invention.

Embodiments of the present invention provide methods, systems and products for editing controls for spatial deformations. Methods, systems and products according to the present invention may be embodied in a number of ways. Certain embodiments of the present invention may, for example, reduce or eliminate ETLAT, streamline a graphical artist's workflow when editing an image, and/or make more efficient use of available space on a display screen, and allow the user to work at a higher resolution.

Illustrative Editing Tool

In one illustrative embodiment of the present invention, a computer system running computer software for editing two-dimensional images displays an editing window. Within the window, an unmodified, two-dimensional image containing an object, such as a gingerbread man, is displayed. The editing tool analyzes the image and generates a standard tessellated mesh to define the object, and to provide parameters that affect the response of the object to a deformation.

A user may deform the object by selecting a point on the image, such as a point on the gingerbread man's leg, and dragging that point to another location in the window, which causes the leg to move and the image to deform. The deformation engine calculates the effect of the movement of the leg on the rest of the image. For example, by moving the leg, the editing tool may calculate that the leg stretches somewhat, the torso is pulled in the direction of the stretched leg, and still other parts of the gingerbread man may be stretched or compressed. The editing tool uses a rendering engine to generate the visual representation of the image, and then displays the deformed image. However, since the image is two-dimensional, if a part of the gingerbread man is moved so that it overlaps with another part of the gingerbread man, the editing tool may not display the desired part of the object in the foreground. For example, if the left leg of the gingerbread man is deformed so that it overlaps with the gingerbread man's right leg, the rendering engine may simply randomly determine which leg should be displayed in the foreground.

To allow a user to easily modify the deformed object, one illustrative embodiment of the present invention provides the user with a representation, such as an outline, of the undeformed object overlaid on the deformed object. The user is able to adjust parameters in the outline of the unmodified object that result in changes to the display of the deformed object. For example, the user may adjust an "overlap" parameter associated with the left leg in the outline to specify that it should be displayed in the foreground. The deformed image, in which the right and left legs overlap, can then be immediately updated to reflect the change made to the unmodified image.

This example is given to introduce the reader to the general subject matter discussed herein. The invention is not limited to this example. Further details regarding various embodiments of products and methods for controlling aspects of a deformation of two-dimensional and three-dimensional images are described below.

Illustrative System

Referring now to the drawings in which like numerals refer to like elements throughout the several figures, FIG. 1 shows a system 100 for editing an image according to one embodiment of the present invention. System 100 comprises a computer 101, a display device 102, and an input device 103. Computer 101 comprises a processor 110 and a computer-readable medium, such as a memory 111, and is in communication with the display device 102 and the input device 103. Memory 111 comprises an application 120 for editing an image, and an image 130. Application 120 comprises a deformation engine 121 and a rendering engine 122. A processor 101 executes the application 120 to allow a user to edit an image.

For example, a user of system 100 may use the application 120 to retrieve image 130 from storage, load it into memory 111, and display it on the display device 102. In general, an image, such as image 130, includes one or more deformable objects, which, when initially displayed, are in an undeformed state. A user of system 100 may then deform one or more of the objects by manipulating it with the input device 103. Deformation engine 121 then deforms the object based on the deformation, and passes the deformed object to the rendering engine 122. The rendering engine 122 renders the deformed object, and the system 100 displays the modified image, including the deformed object, on the display device 102.

After the deformed object has been displayed, a user may further edit the object by modifying parameters associated with the deformed object. For example, if the deformation caused one part of the object to overlap with another part, the user may wish to specify which of the two overlapping areas should be displayed in the foreground. System 100 can display a representation, such as an outline, of the undeformed object overlaid on the deformed object to help the user select a part of the object to modify. The user may then select a point within the outline of the unmodified object, rather than within the deformed object, and change a parameter that affects which of the overlapping parts should be displayed in the foreground, and which should be obscured. The change made to the parameter within the outline causes system 100 to execute deformation engine 121 to deform the object again; this time the deformation engine 121 deforms the object based at least in part on the changed parameter. The deformation engine 121 then passes the deformed object to the rendering engine 122, which renders the object. System 100 displays the deformed object with the desired area in the foreground.

Illustrative Methods

Further embodiments of the present invention will be described in more detail below with respect to FIGS. 2-18.

Figure 2:
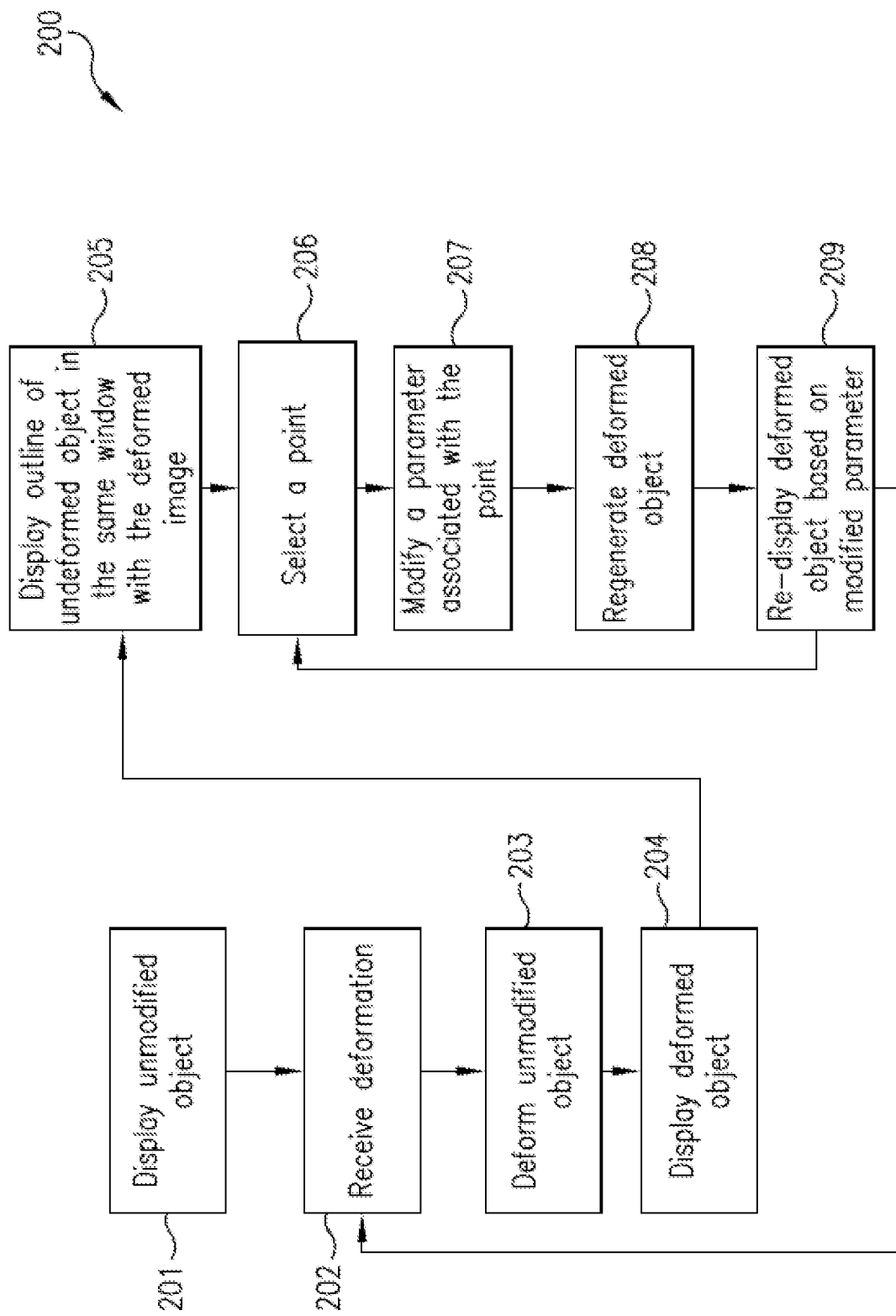
FIG. 2 shows a flowchart illustrating a method for editing an image according to one embodiment of the present invention.

For example, FIG. 2 shows a flowchart illustrating a method 200 for editing an image according to one embodiment of the present invention, which will be described with reference to the system 100 discussed above. FIGS. 3-9 show a gingerbread man in various states of deformation.

Figure 3:
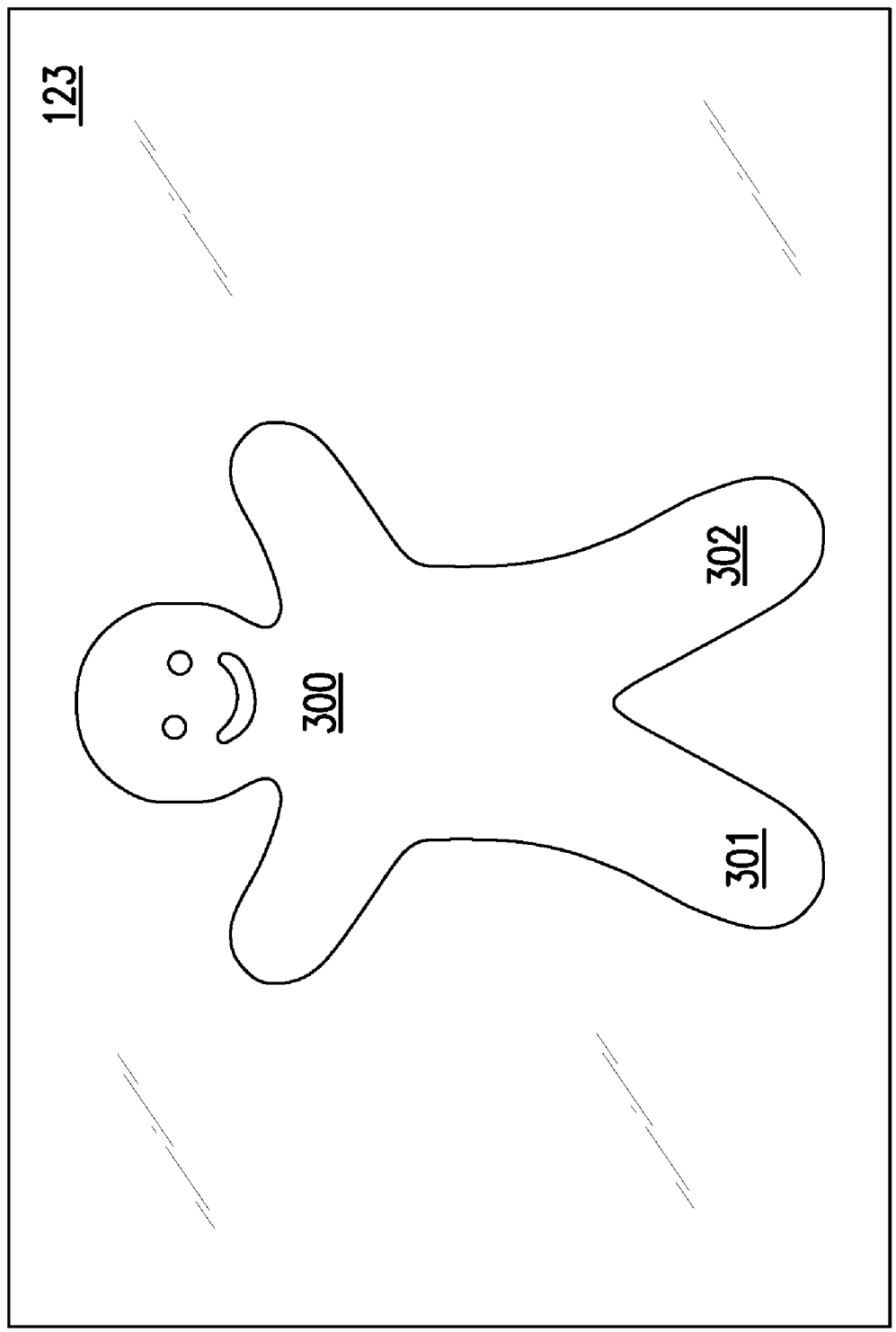
FIGS. 3-10 show an editing window and an object according to one embodiment of the present invention.

The method 200 begins in block 201, where the system 101 displays an unmodified object. For example, a user may execute an image editing application 120 on the system 100 to display an image 130, such as a gingerbread man 300 as shown in FIG. 3, on a display device 102 in an editing window 123. To display the gingerbread man 300, the user may start the application 120 and load the gingerbread man 300 from storage, such as from a hard drive, into memory 111. The system 100 can then display 201 the image 130 on the display device 102.

In the embodiment shown in FIG. 3, the gingerbread man 300 is the only object in the image 130, though other objects could be included in the image 130 as well. Initially, when the image 130 is displayed, it has zero or more unmodified objects. Each of the objects within the image 130 may be subsequently deformed, but the initial state of each object when loaded into the application 120 is the object's unmodified state.

But, because a user may edit an image 130 for a time, then save the image 130 to storage for later use and close the application 120. The next time the user loads the image from storage, the unmodified state of the objects in the image 130 may be different. Various embodiments of the invention may handle this situation differently. For example, one embodiment of the present invention may determine an unmodified state for each object, e.g., the state of the object when the object is created. As the user repeatedly edits, saves, and reloads the image 130, the initial unmodified state of each object within the image may be stored with the deformed image. Thus, the next time the user loads the image 130 from storage, even after many iterations of editing, the initial unmodified state of each object is loaded along with the deformed state of each object.

Other embodiments may allow a user to select a new unmodified state for an object. For example, the user may create an image having an object, in which the object has an initial unmodified state. The user may edit the object, and reach a configuration of the object that is more desirable. The user may then use the application 120 to store the new, desirable state as the new unmodified state. This may provide the user with a new reference point for future edits of the object. Still further embodiments would be apparent to one of ordinary skill in the art.

Some embodiments of the present invention may also perform additional steps when an image 130 is loaded from storage. For example, in one embodiment of the present invention, an image editing application 120 may generate a tessellated mesh for each object in an image, or such a mesh may be saved as a part of the image 130. An object, such as a gingerbread man 300, may be represented by the application 120 as a grouping of adjoining polygons, such as triangles, that make up a mesh. The shape of the mesh generally conforms to the shape of the object, and provides data to allow the deformation engine 121 and the rendering engine 121 to process the object. For example, the deformation engine 121 may use the mesh to determine how a deformation causes the shape of an object to change. The rendering engine 122 may use the mesh to apply textures, shadows, shading, or other features to the rendered object.

While the embodiments discussed herein have referred to software deformation engines and rendering engines, other embodiments may comprise software and/or hardware deformation engines and rendering engines. For example, in some embodiments, deformation engine 121 and/or rendering engine 122 may comprise specialized hardware configured to efficiently process a tessellated mesh.

Figure 4:
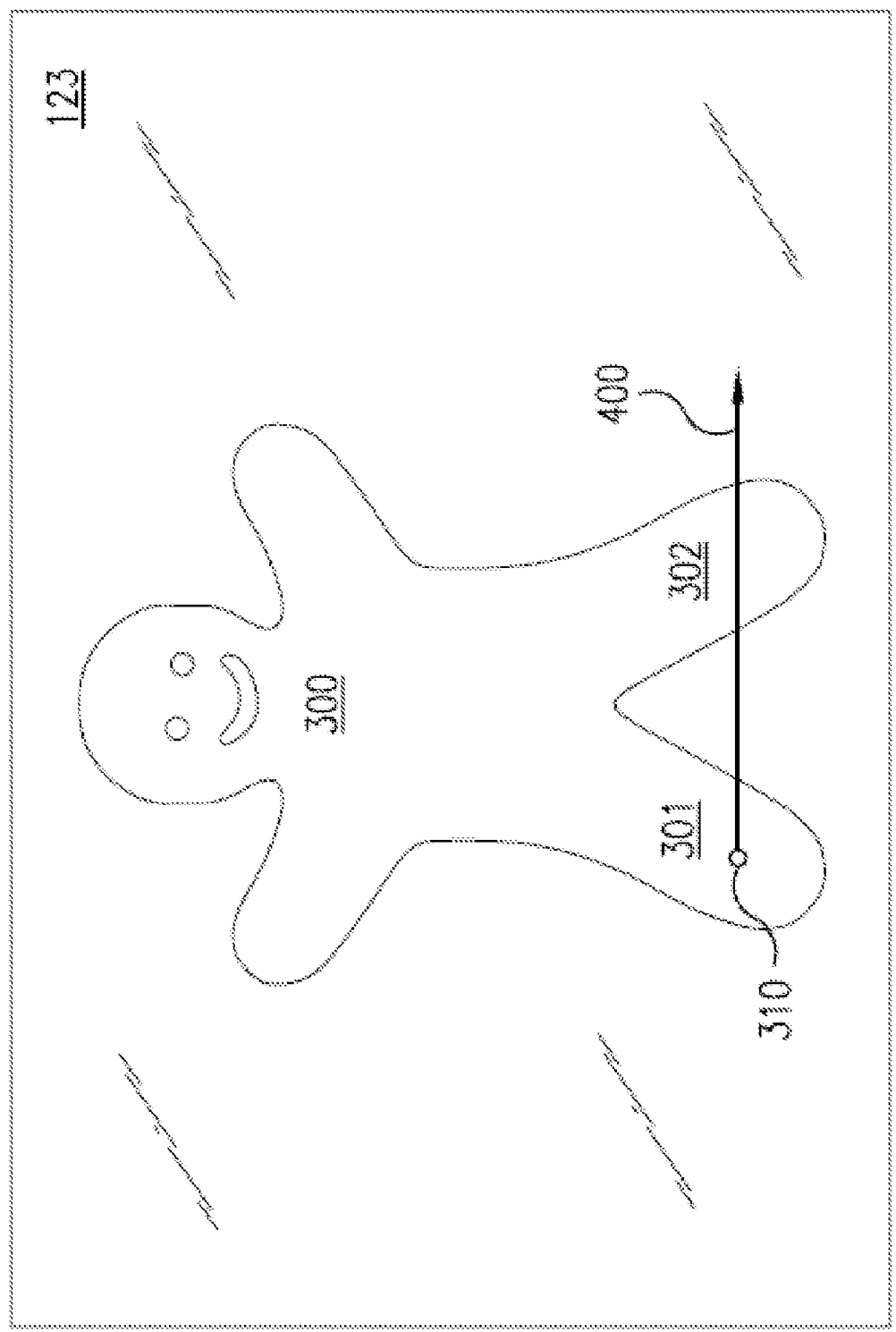

In block 202, a user interacts with the application 120 to indicate a deformation of the object. For example, a user may specify that the right leg 301 of the gingerbread man 300 should be moved to the left. FIG. 4 shows this deformation as an arrow 400.

A user may deform an object in a variety of ways. For example, in one embodiment of the present invention, a user uses a mouse to click on a point on the object, and drag the point to a new location. In such an embodiment, the application 120 interprets this input as a deformation of the object. In another embodiment, a user may add one or more control points to the object.

A control point, in one embodiment of the present invention, may be added to an object to provide a user with a point at which to manipulate the object. The control point may be associated with the unmodified object, and allow the user to use the control point to deform the object. In one embodiment, one or more control points may be associated with one or more vertices within a mesh corresponding to the object. In such an embodiment, a user may not be able to deform the object from any arbitrary point, but only by manipulating one of the control points.

Further, control points may have one or more associated parameters. For example, in one embodiment, a control point may have an overlap parameter and a starchiness parameter associated with it. A user may manipulate the one or more parameters to cause a change in the appearance of the object. A more detailed description of types of parameters and their effect on an object is described below.

For example, in one embodiment of the present invention, a user specifies a control point 310 and a movement path. The movement path specifies how the control point 310 should move over one or more frames of animation. For each frame in which the control point 310 moves along the movement path, the object may be deformed. For example, the arrow 400 in FIG. 4 may specify a movement path for several frames of animation. For each frame of animation, the leg moves a distance along the path. Each frame may comprise a deformed gingerbread man with its leg at different states of travel along the movement path. Such an embodiment may allow an animator to more easily animate an object, rather than by manually creating multiple, successive deformations.

After receiving the deformation, the method 200 continues to block 203, where the unmodified object is deformed. Once the user has specified a deformation for an object, the system 100 executes deformation engine 121 to determine a new shape for the object based at least in part on the unmodified object and the deformation. As discussed above, the image editing application 120 may generate a tessellated mesh corresponding to the gingerbread man 300. The deformation engine 121, according to one embodiment of the present invention, may determine how one of the gingerbread man's 300 legs should change shape based on the deformation received from the user. In addition, the deformation of the leg may also cause other parts of the gingerbread man 300 to change shape, as is discussed in greater detail below. Once the deformation engine 121 has finished deforming the object, it passes the deformed object to the rendering engine 122, which renders the image.

Figure 5:
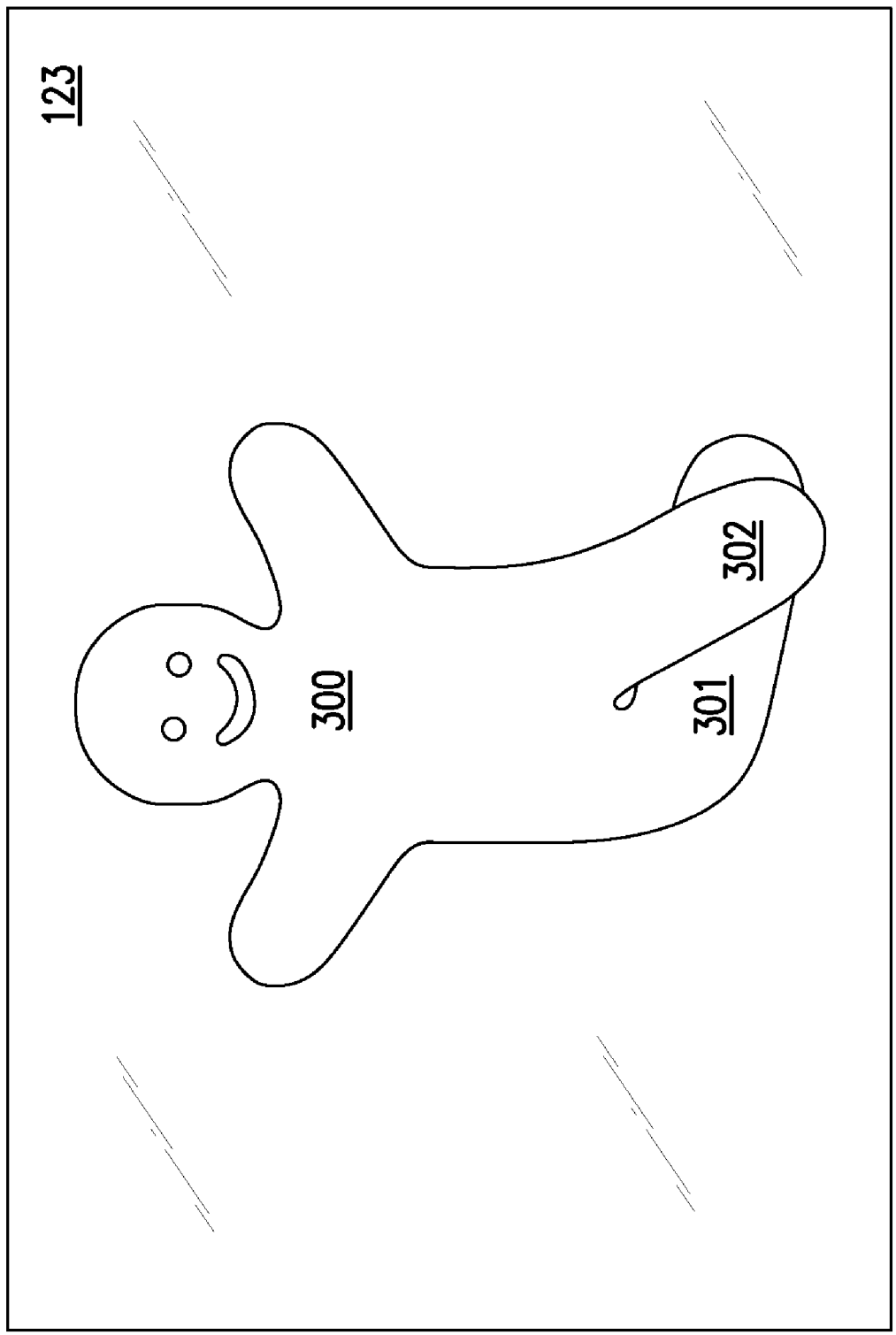

System 100 then displays the deformed gingerbread man 300 in the editing window 123, as shown in block 204 and in FIG. 5. As can be seen in FIG. 5, the gingerbread man's 300 right leg 301 has crossed underneath its left leg 302 based on the user's specified deformation 400.

Figure 6:
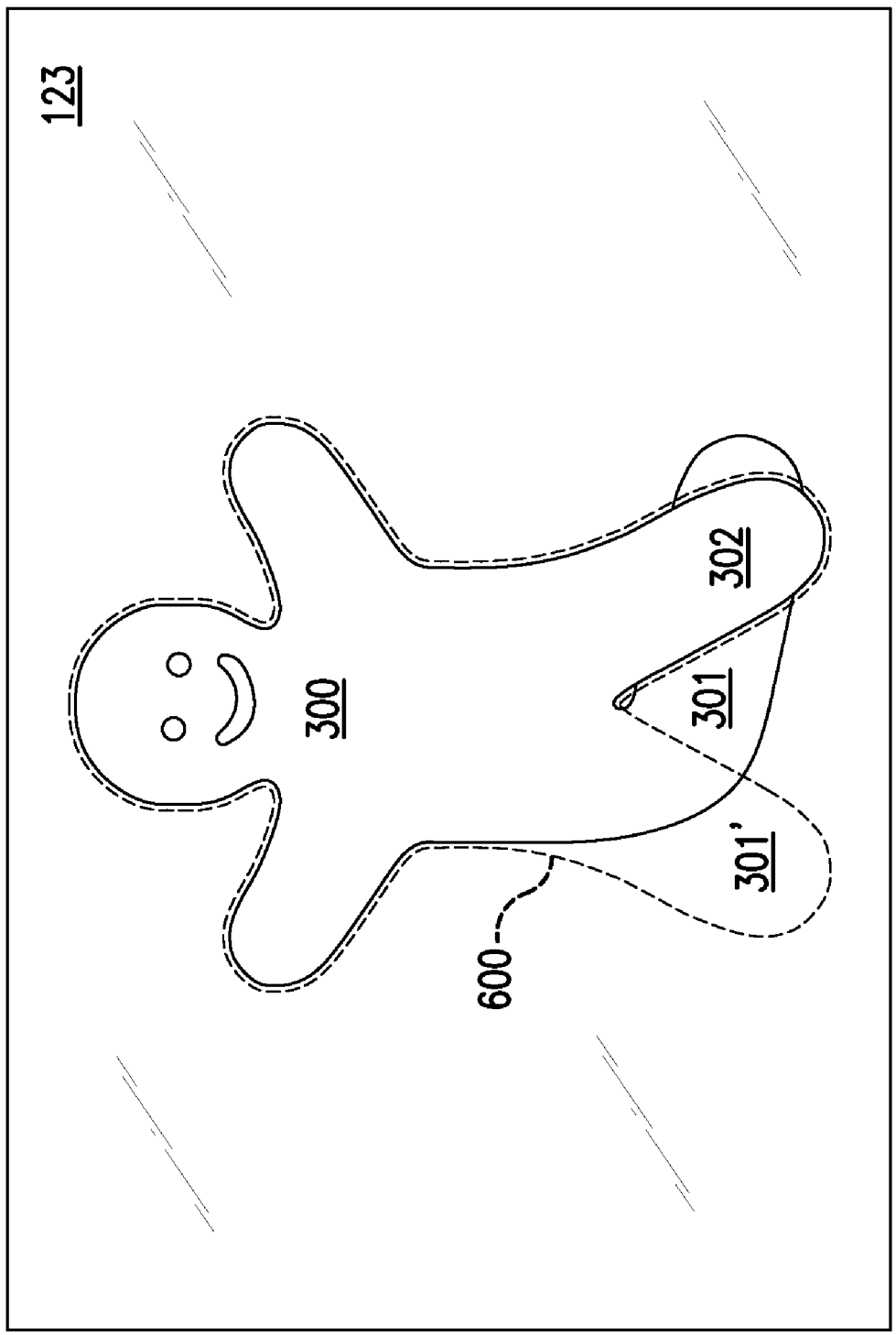

In block 205, the user may command the system 100 to display a representation of the undeformed object in the same window as the deformed object. As shown in FIG. 6, for example, a representation, such as an outline 600 of the undeformed object, is displayed in the same window 123 as the deformed object. For example, the user may select an option from a context-sensitive menu to display the outline in the editing window 123. In another embodiment, the outline may automatically appear. This allows the user to view in the same window the outline 600 of the unmodified object and the deformed object. The user can then make a modification to the undeformed object, represented by the outline 600, and view the resulting change to the deformed object without shifting focus to another window.

While the representation is shown as an outline 600, other representations are possible, and are within the scope of this invention. For example, in one embodiment of the present invention, the outline may be optionally filled with a partially-transparent color. In one embodiment of the present invention, the outline 400 may comprise a partially transparent, fully-rendered image of the unmodified object. In another embodiment, the representation may comprise a wire-mesh representation of the unmodified object. Still further embodiments may comprise other representations of the unmodified object that would be apparent to one of ordinary skill in the art.

In the embodiment shown in FIG. 2 and FIG. 6, the outline 600 of the undeformed object is overlaid on the deformed object; however, in one embodiment, the outline 600 may be offset from the deformed object, though still displayed in the same window 123. After the user has deformed the gingerbread man 300, the user may wish to change how the deformed object looks. The outline 600 provides the user with a visual depiction of how the object has deformed from its unmodified state, and may be useful for providing an alternate means for editing the deformed object.

Figure 7:
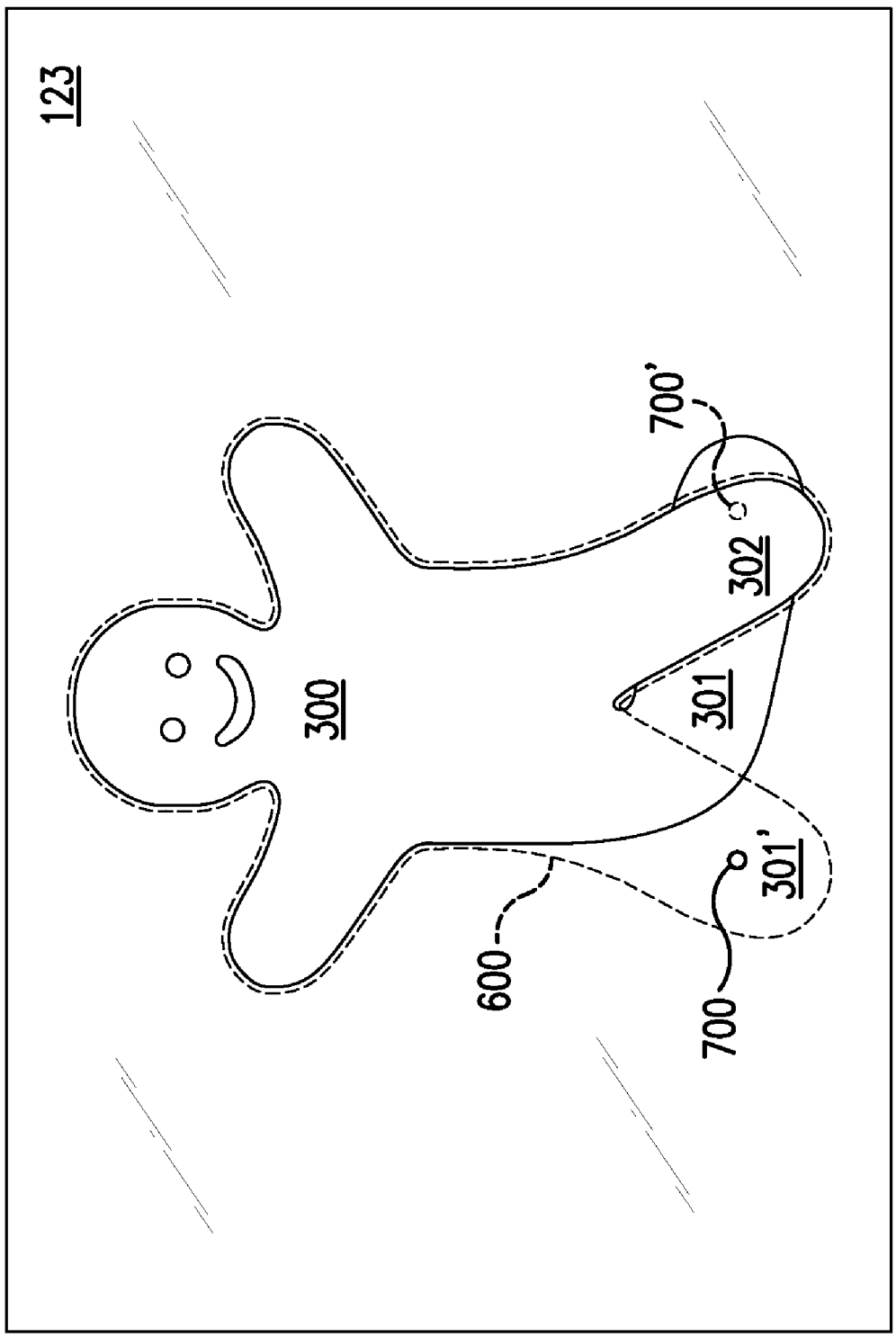

In block 206, a user designates a control point within the outline 600 of the undeformed object. For example, the user may want the right leg 301 to appear in front of the left leg 302. To accomplish this task, a user designates a control point 700 within the outline 600 of the unmodified gingerbread man. FIG. 7 shows a control point 700 added within the outline 600 of the unmodified gingerbread man. While the control point 700 was added within the outline 600, it is not necessary that control points be added within a representation of the unmodified image. A control point may be added to an image and associated with an unmodified object, such as by associating the control point with a representation of the unmodified object. This may allow a user greater flexibility when adding control points to an object.

Also visible in FIG. 7 is the position the control point 700' would have in the deformed gingerbread man 300. As can be seen, because the right leg 301 is located behind the left leg 301, it may be impossible for a user to spatially select the right leg 301 of the deformed gingerbread man 300 to adjust a parameter associated with the right leg 301. Thus, it may be necessary for a user to interact with the corresponding location in the outline 600. By adding control point 700, the user specifies a location in the outline 600, and sees the corresponding control point 700' in the deformed object. This allows a user to easily interact with an obscured part of a deformed object.

In addition, the overlaid outline of the unmodified image allows the user to easily shift their focus between modifications made within the outline 600 and the result in the deformed image. For example, a user may adjust a parameter in the outline 600 and view the resulting change to the deformed object. The immediate feedback offered by displaying the two representations of the object in the same window, as well as the reduced need to move the user's field of vision between different windows may aid a user when deforming an object. Further, by displaying the unmodified object and the deformed object in the same window, more room on the display is available for the single window, rather than in a multi-windowed display that may significant reduce the available screen space to show both the unmodified object and the deformed object.

Figure 8:
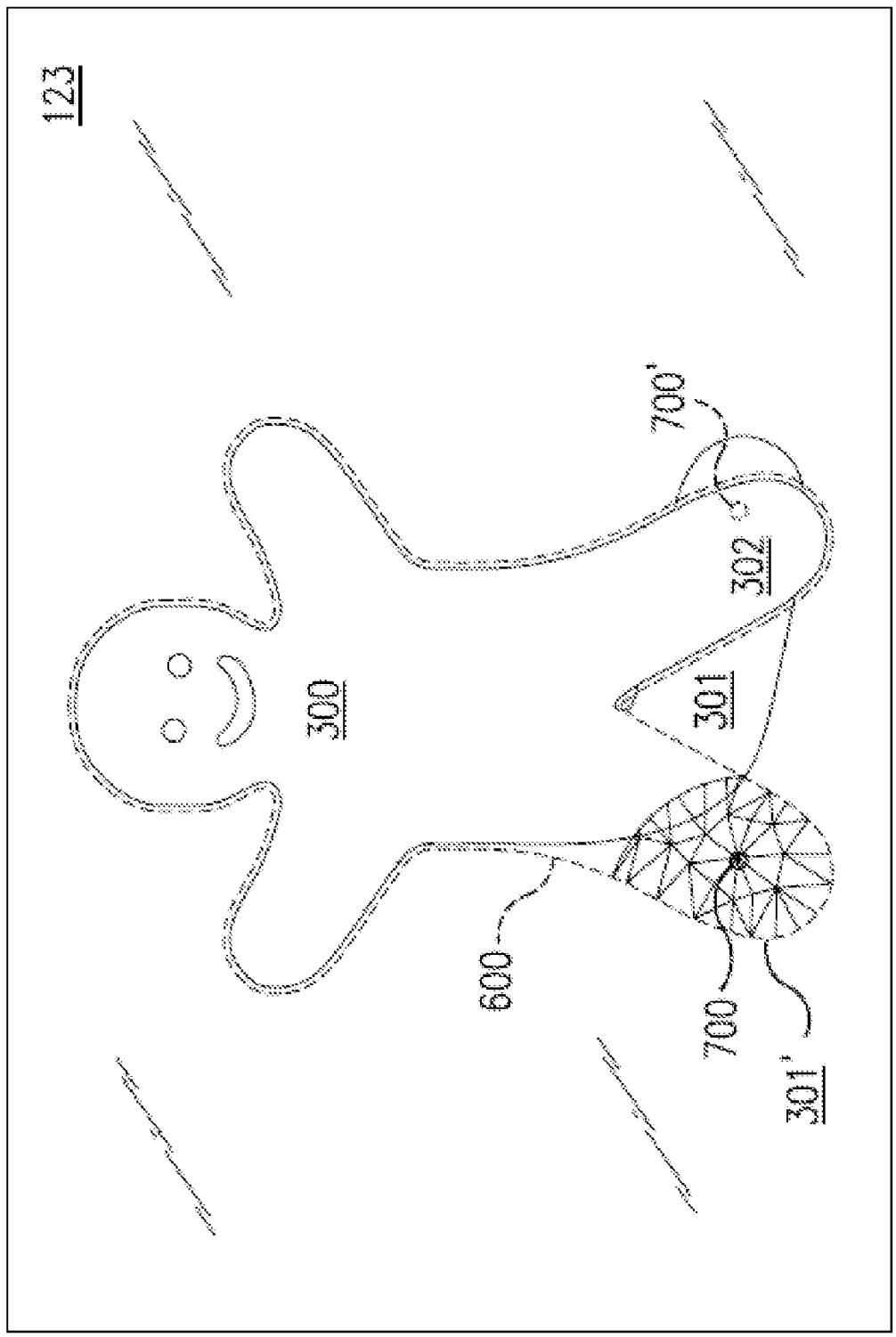

In block 207, the user may modify a parameter associated with the control point 700, shown in FIGS. 7 and 8, to cause a change at the corresponding control point 700' in the deformed object. For example, if the user wishes to display the right leg 301 in front of the left leg 302, the user may modify a parameter associated with control point 700, and view the resulting change in the deformed gingerbread man 300.

One of the parameters that may be associated with a control point 700 is an overlap parameter. In the embodiment shown, the overlap parameter includes two values, an overlap value and an extent value. The overlap value specifies a level of "in-frontness" or overlap for a part of an object, while the extent value specifies the region affected by the control point 700. In other embodiments, the overlap parameter may include other values.

Because gingerbread man 300 is a two-dimensional object, when two parts of the gingerbread man overlap, the rendering engine 122 may not have a clear indication of which of the overlapping regions should be in the foreground. The overlap value of an overlap parameter may be used by the rendering engine 122 as a pseudo third dimension. For example, before the user adjusts the overlap parameter associated with the control point 700, the right leg 301 and the left leg 302 may have the same overlap value, or no overlap value. In which case, the rendering engine may randomly select which leg to display in the foreground. But if the user increases the overlap value of the right leg's 301 overlap parameter so that it is greater than the overlap value associated with the left leg 302, the rendering engine 122 displays the right leg 301 in the foreground. Conversely, the user may decrease the overlap value associated with the right leg 301 to a value less than the left leg's 302 overlap value to ensure that the right leg 301 is obscured by the left leg 302. Other parameters, such as starchiness, may be associated with the control point 700 as well, and are discussed in more detail below.

As can be seen in FIG. 8, a shaded wireframe mesh region surrounds control point 700. In the embodiment shown, the shading provides the user with a graphical indication of the overlap value. For example, brighter shading may indicate a higher overlap value, while darker shading may indicate a lower overlap value. The graphical indication may provide an easy reference for a user regarding the overlap value without requiring the user to view a numerical value, or perform additional actions to display the overlap value for a region. In addition, if multiple overlap values are shown within the outline 600, the relative brightness of the various overlap parameter extents may provide the user with an indication of which elements have greater overlap values with respect to other overlap values. This too may aid a user editing the object.

The extent value of the overlap parameter indicates how large of an area is affected by the overlap parameter. FIG. 8 shows a shaded wireframe mesh region surrounding control point 700. The shaded wireframe mesh region is a graphical representation of the extent value of the overlap parameter. The extent value, as shown in FIG. 8, is sized to include substantially all of the gingerbread man's 300 right leg 301'. This causes the overlap value to be applied to each point within the region defined by the extent value. Because substantially all of the right leg 301' is within the region, the overlap value is applied to substantially all of the right leg 301. Thus, the right leg 301 is shown in front of the left leg 302. However, if the extent value were reduced so that only part of the right leg 301' were affected by the overlap parameter, only the portions of the right leg 301 affected by the overlap parameter will be displayed in front of the left leg 302, which may have an undesirable result in the displayed gingerbread man.

As shown in FIG. 8, the extent value defines a radius around the control point 700; however, the extent value may not always define a radius. In some embodiments the extent value may define the length of a side of a shape, such as square or polygon, or a region of arbitrary shape and size.

While methods for modifying an overlap parameter associated with a control point were described above, control over which leg is displayed in the foreground may be accomplished in other manners as well. A user may add control point 700 to unmodified right leg 301', and increase the overlap value so that the modified right leg 301 is displayed in front of the left leg 302. If the user later decides it would be better to have the left leg 302 in the foreground, the user may accomplish this in different ways. One method was described above: the user may simply decrease the overlap value associated with the control point 700 until the right leg's 301' overlap value is less than the left leg's overlap value. But the user instead may cause the same result by moving control point 700, with the increased overlap value, over to the left leg 302' in the outline 600. Because the overlap value is associated with the control point 700, when the control point 700 is relocated to the left leg 302', the corresponding overlap value is applied to the left leg 302. This may cause the left leg 302 to be displayed in the foreground. Alternatively, the user may add a new selected point to the left leg 302' and increase an overlap value associated with the new control point until it is greater than the overlap value of the control point 700 in the right leg 301. These techniques for modifying parameter values, though discussed in relation to an overlap parameter, are equally applicable to modifying other parameters associated with a selected point.

In block 208, the system 100 regenerates the deformed object based at least in part on the deformation and the modified parameter. For example, after the user has modified a parameter associated with the control point 700, the application 120 executes the deformation engine 121, if necessary, and the rendering engine 122 to regenerate the deformed object. The deformation engine 121 may not be executed in all cases as all parameters may not be associated with the physical deformation of the object. The overlap parameter may generally indicate which of two or more overlapping areas in the deformed object should be displayed in the foreground, but may not indicate how the object should react to a deformation.

For example, in FIG. 7, the rendering engine determined that the left leg should be displayed in the foreground. However, the overlap parameter gives the user the ability to specify that the right leg should be displayed in the foreground. Thus, while the overlap parameter may affect the appearance of the deformed object, it may not have any effect on the deformation. Though in some embodiments, the deformation engine may deform the object differently when an overlap parameter is modified. Other parameters may affect how the deformation engine 121 deforms the object and are discussed below.

Figure 9:
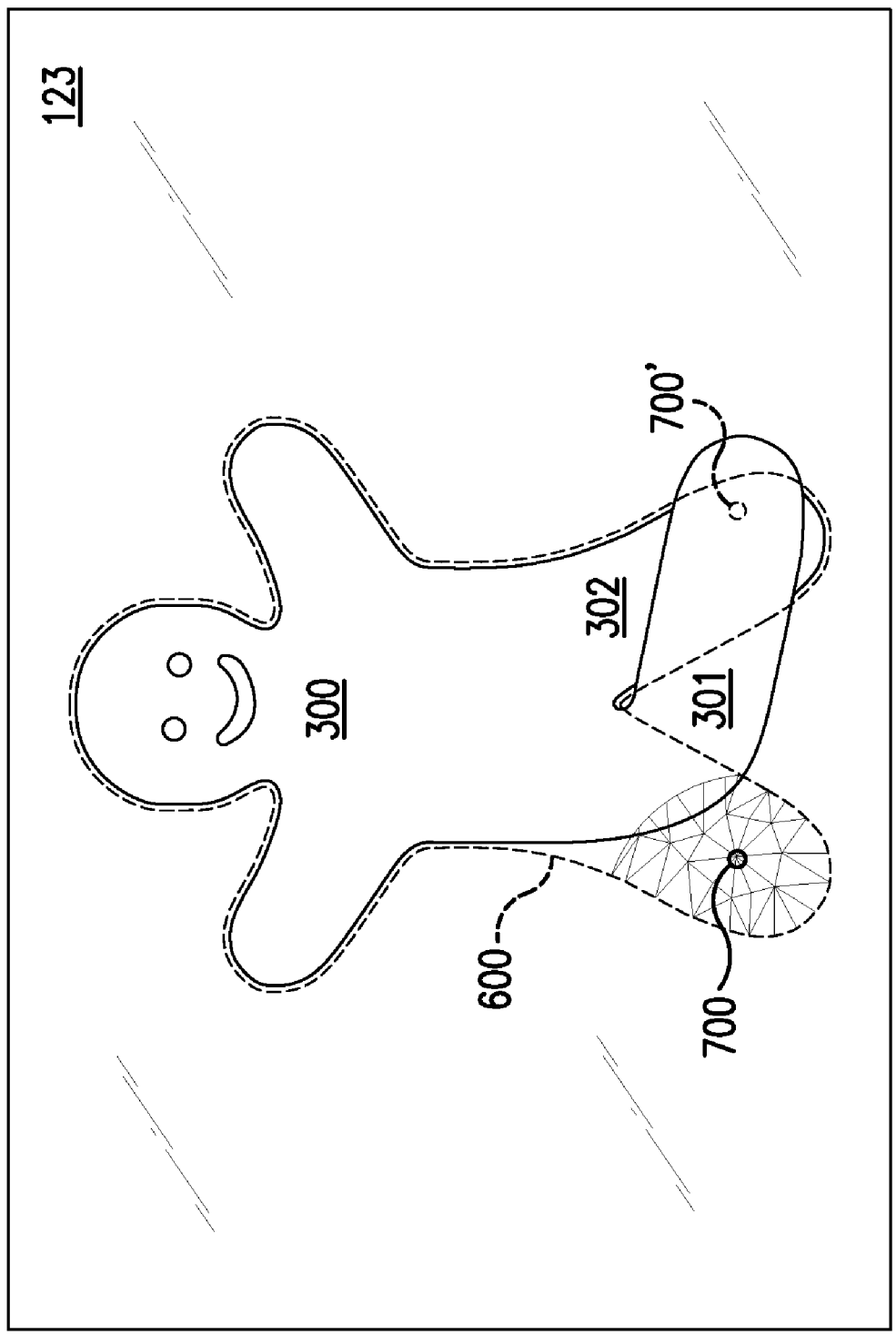
Figure 10:
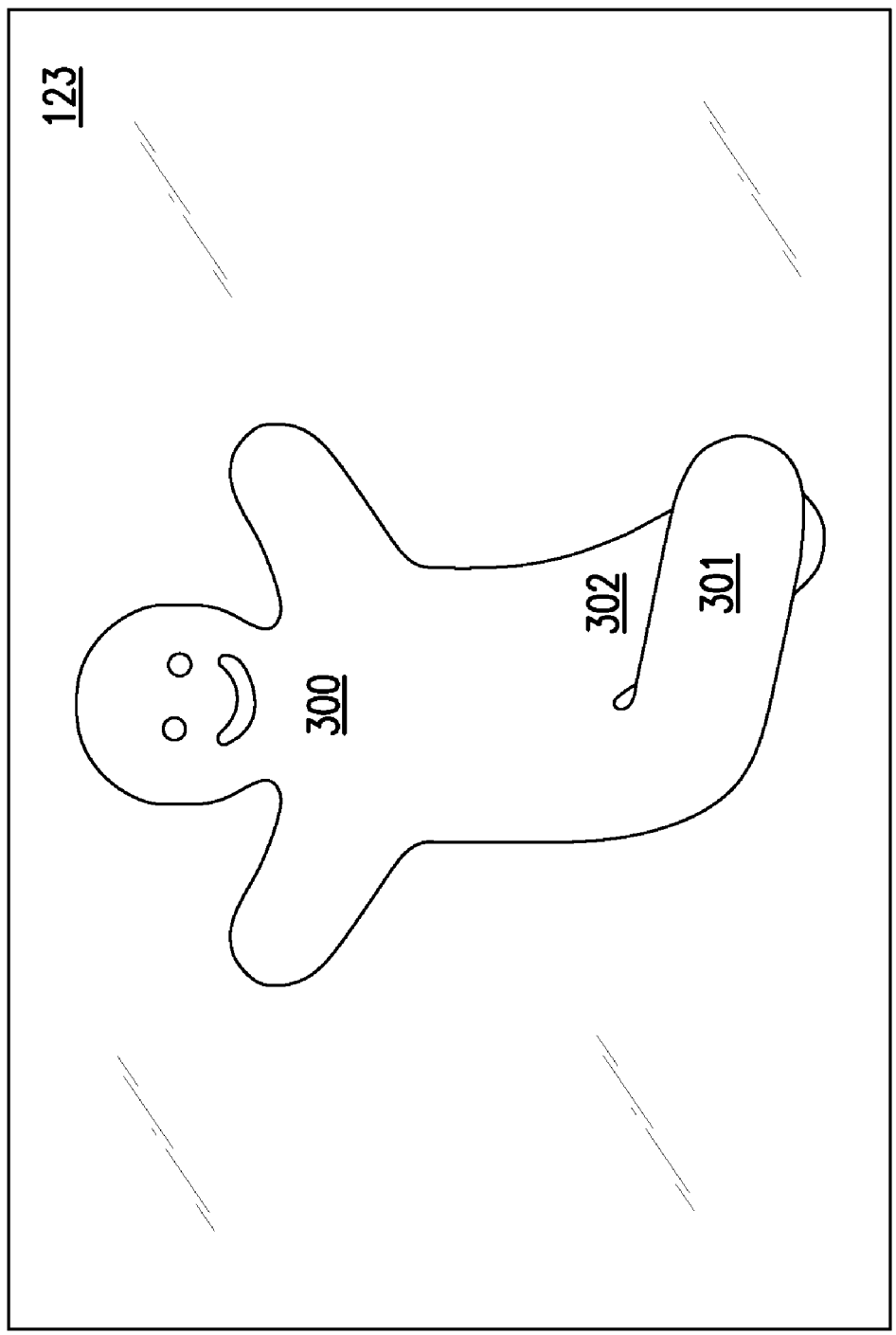
Figure 11:
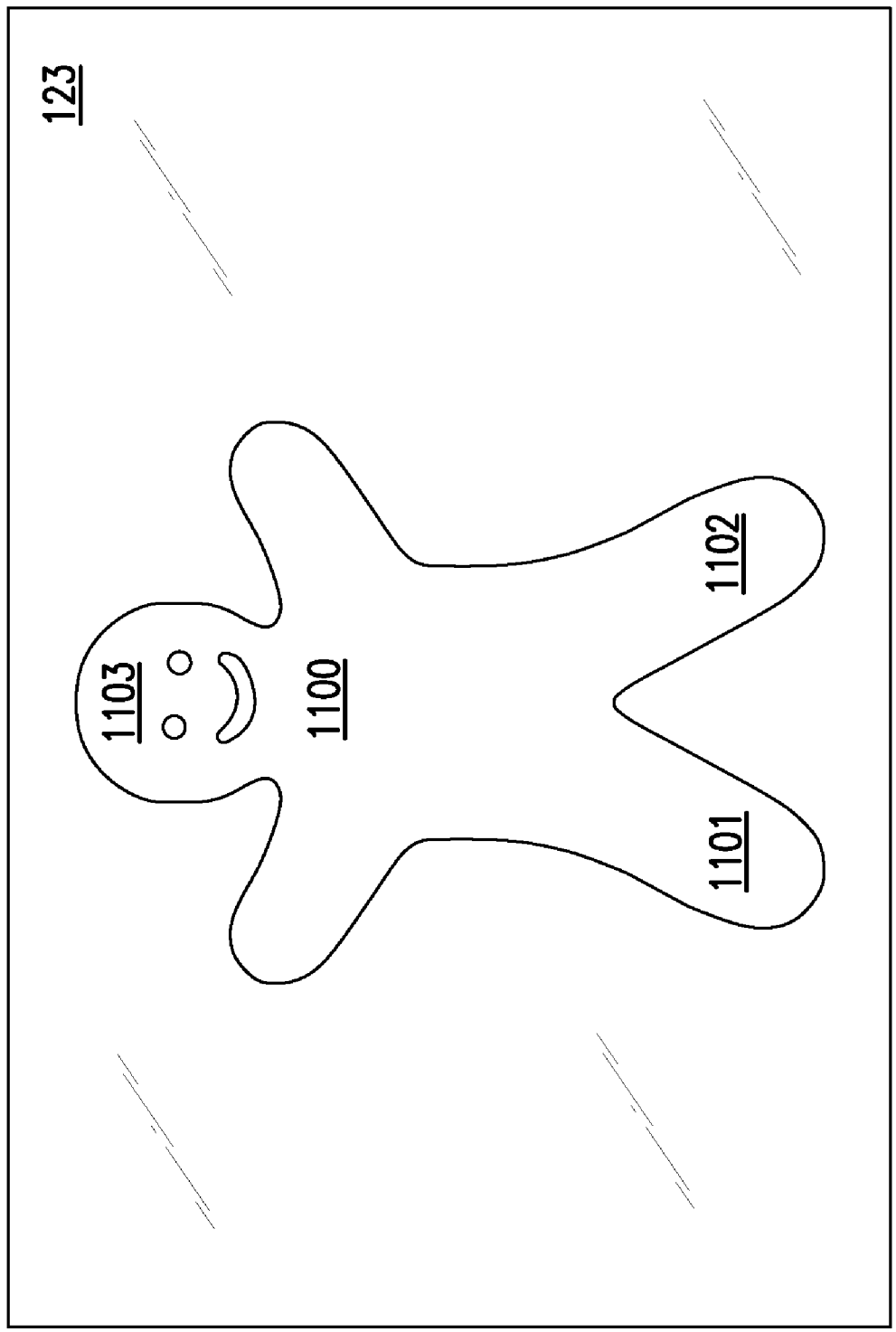
FIGS. 11-18 show an editing window and an object according to one embodiment of the present invention.

In block 209, after the deformed image has been regenerated, the system 100 displays the regenerated deformed object on a display device 102 as shown in FIGS. 9 and 10. FIG. 9 shows the regenerated deformed object based on the modification to the overlap parameter at control point 700. This shows that a user who has manipulated the overlap parameter may be able to view the result of the modification while the overlaid editing controls are still visible. In FIG. 10, only the regenerated deformed image is shown. The user may then return to block 202 to deform the object again, or may return to block 206 to select another point to modify.

Further permutations are contemplated in other embodiments of the present invention, and the blocks described above may be performed in different orders. In addition, additional parameters may be edited by a user according to other embodiments of the present invention. For example, FIGS. 11-18 show a deformation of an object in an image according to one embodiment of the present invention. The figures will be described in relation to the method 200 shown in FIG. 2 and the system shown in FIG. 1. As discussed previously, a user may deform and object, such as gingerbread man 1100 shown in FIG. 11, by using a system 100 executing an application 120 for editing an image.

In block 201, the system 100 displays the unmodified object. The user may interact with the application 120 to deform the gingerbread man 1100, such as by using the input device 103 as described above.

Figure 12:
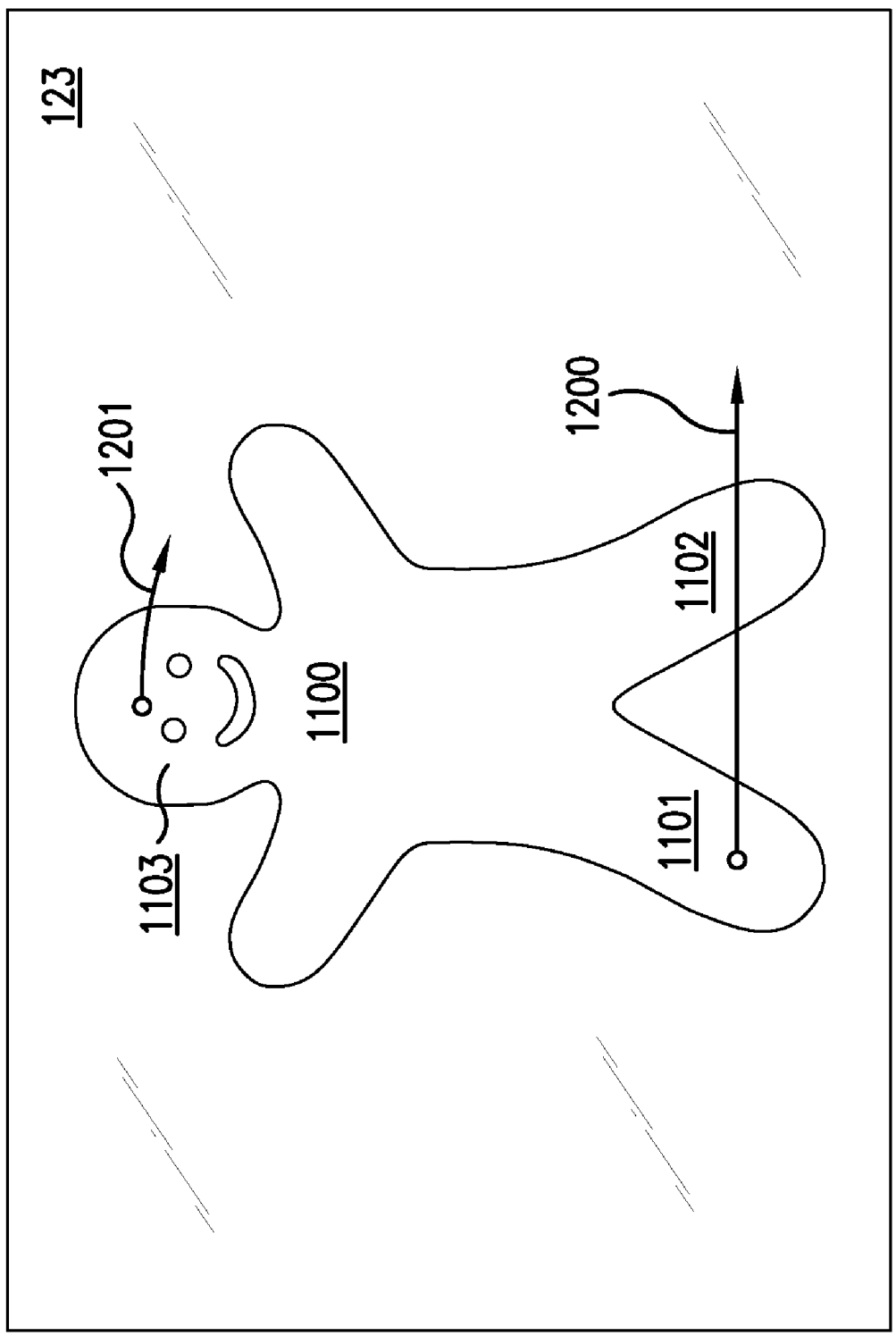

In block 202, system 100 receives a deformation of the object from the user. In the embodiment shown in FIG. 12, the user has specified deformation 1200 to move the gingerbread man's 1100 right leg 1101 to the left, similar to the deformation shown in FIG. 4. But, also shown in FIG. 12, is deformation 1201. Deformation 1201 was not specified by the user, but rather is an indirect deformation caused by the movement of the gingerbread man's 1100 right leg 1101. Indirect deformations may be caused by the deformation engine's 121 calculations when deforming an object based on a user's deformation, such as deformation 1200. In the embodiment shown in FIG. 12, the indirect deformation will cause the gingerbread man's 1100 head 1103 to tilt to his left, as indicated by arrow 1201. It should be noted that arrows 1200, 1201 are not visible to a user in the embodiment shown, but rather are to aid in understanding the deformation of the gingerbread man 1100. However, such indicators may be visible in one embodiment of the present invention.

In block 203, the deformation engine 121 deforms the gingerbread man 1100 based on the deformation 1200. In the embodiment shown, deformation engine 121 determines that the right leg 1101 will deform by moving to the left, and that the head 1103 will rotate to the left as well.

As was discussed earlier, in some embodiments of the present invention, an application 120 may generate a mesh corresponding to an object. Further, this mesh may be used by the deformation engine 121 to determine how the object will deform based on the input deformation.

A mesh comprises a plurality of vertices and a plurality of lines (called edges) connecting the vertices to create a plurality of adjacent polygons. The edges of the polygons may stretch or compress as the object deforms. If this stretching or compression propagates to other areas of the object, those areas may deform as well. Therefore, to reduce or eliminate the propagation of a deformation into a region, a user may modify a starchiness parameter associated with the region.

A starchiness parameter comprises two values: a starchiness value, and an extent value. The starchiness value describes the resilience of a location in an object. A greater starchiness value in a location may reduce the amount of indirect deformation caused to the location, while a lower starchiness value may make a location more susceptible to deformation. The extent value defines the size of the area affected by the starchiness parameter, and may be a radius extending from a selected point, or as otherwise described above with respect the overlap parameter. Thus, by adjusting a starchiness parameter associated with a location, a user may affect how the object deforms.

Figure 13:
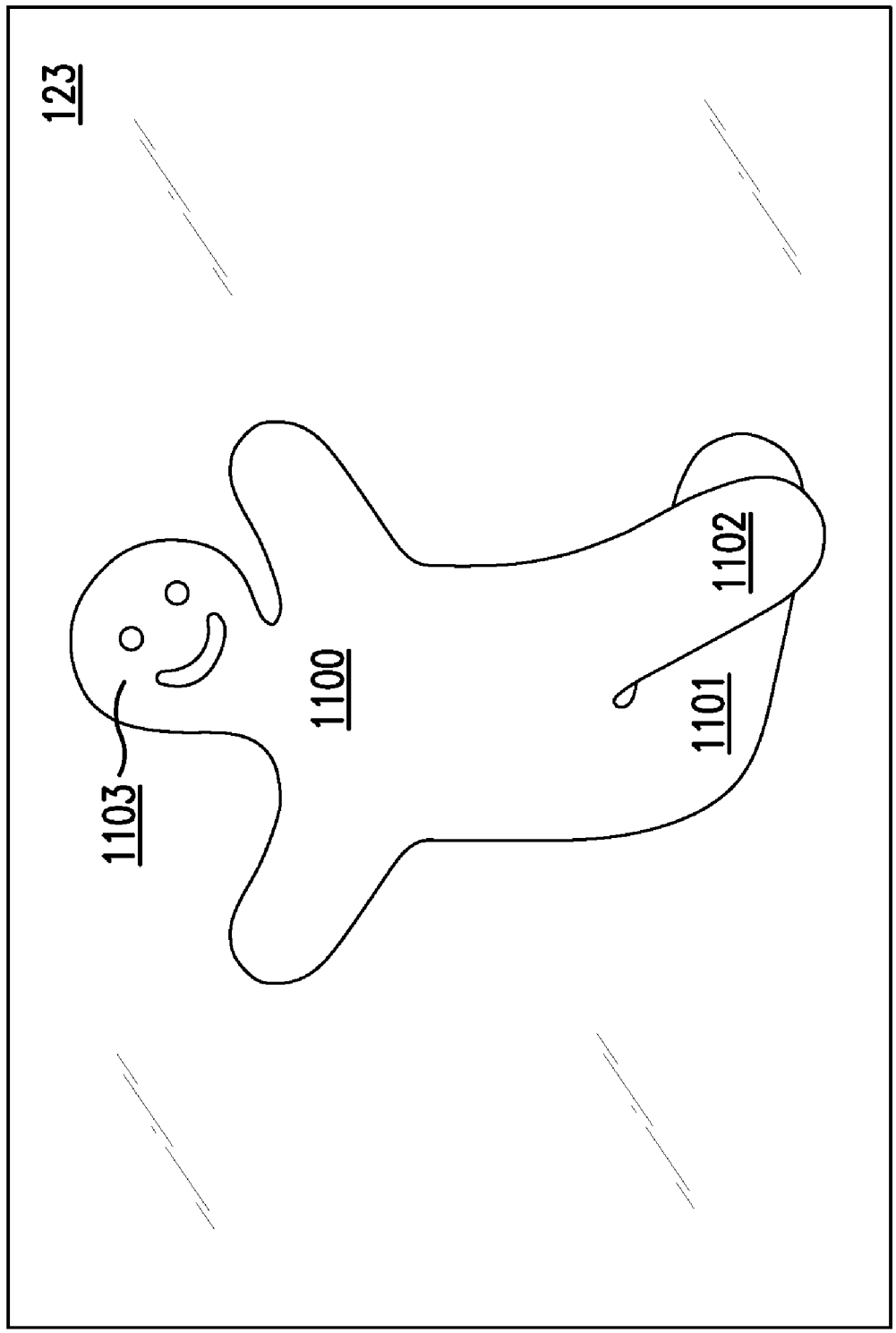
Figure 14:
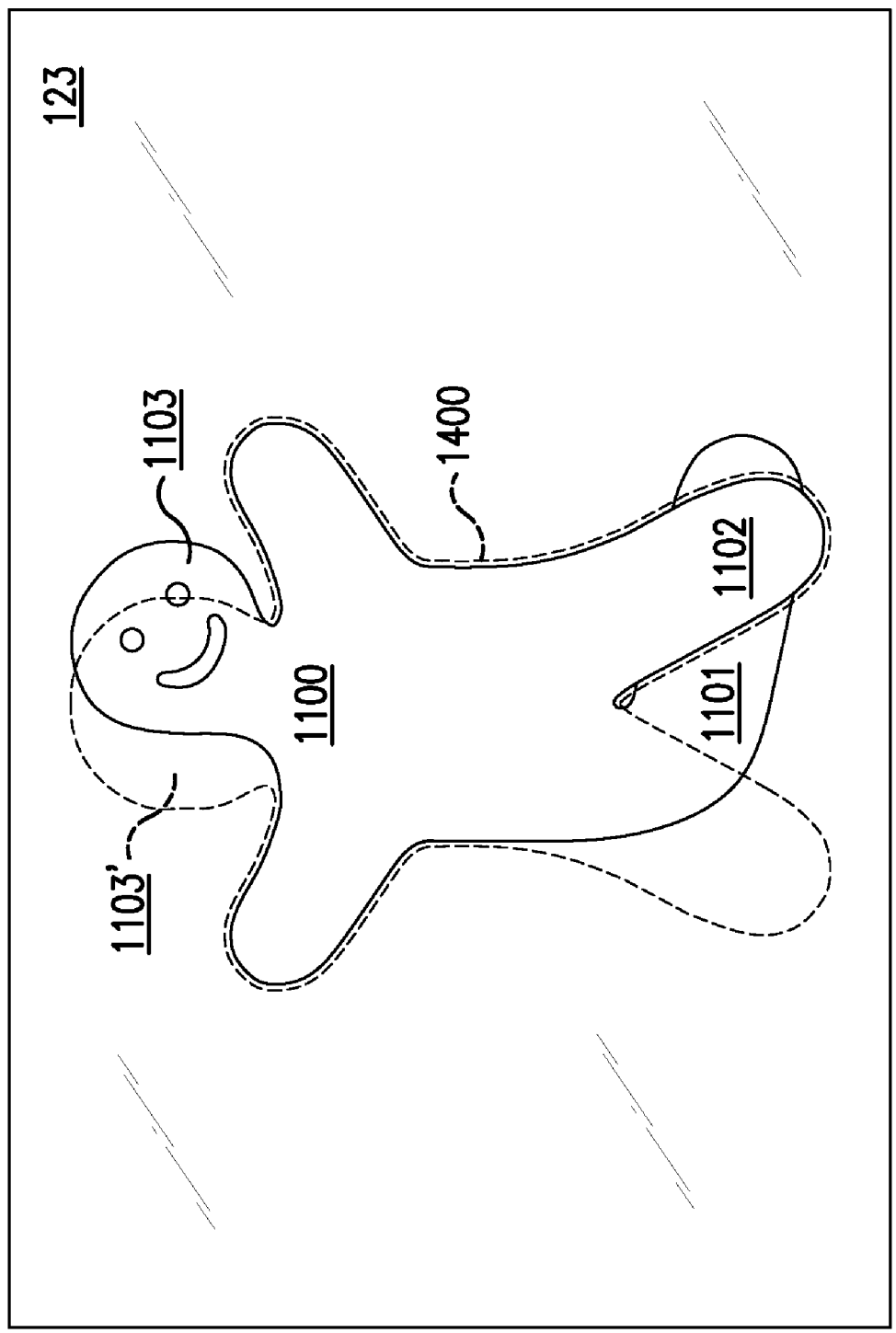

In block 204, the deformed object is displayed. The deformed gingerbread man 1100 can be seen in FIG. 13. As suggested by arrows 1200, 1201, the right leg 1101 has crossed under the left leg 1102, and the head has tilted to the left. However, a user may desire that the head 1103 not deform from its original location, or deform to a lesser degree than is shown in FIG. 13. To address this unwanted deformation, the user may adjust a parameter associated with the head 1103.

In block 205, the user causes the application 120 to display a representation of the unmodified object in the same window. In the embodiment shown in FIG. 14, the representation comprises an outline 1400, which is overlaid on the deformed object in the same window. As discussed earlier, by displaying the outline 1400 of the unmodified image in the same window as the deformed image, a user may maintain focus on the deformed object while interacting with the unmodified object. This may provide a more streamlined and efficient workflow for the user.

Figure 15:
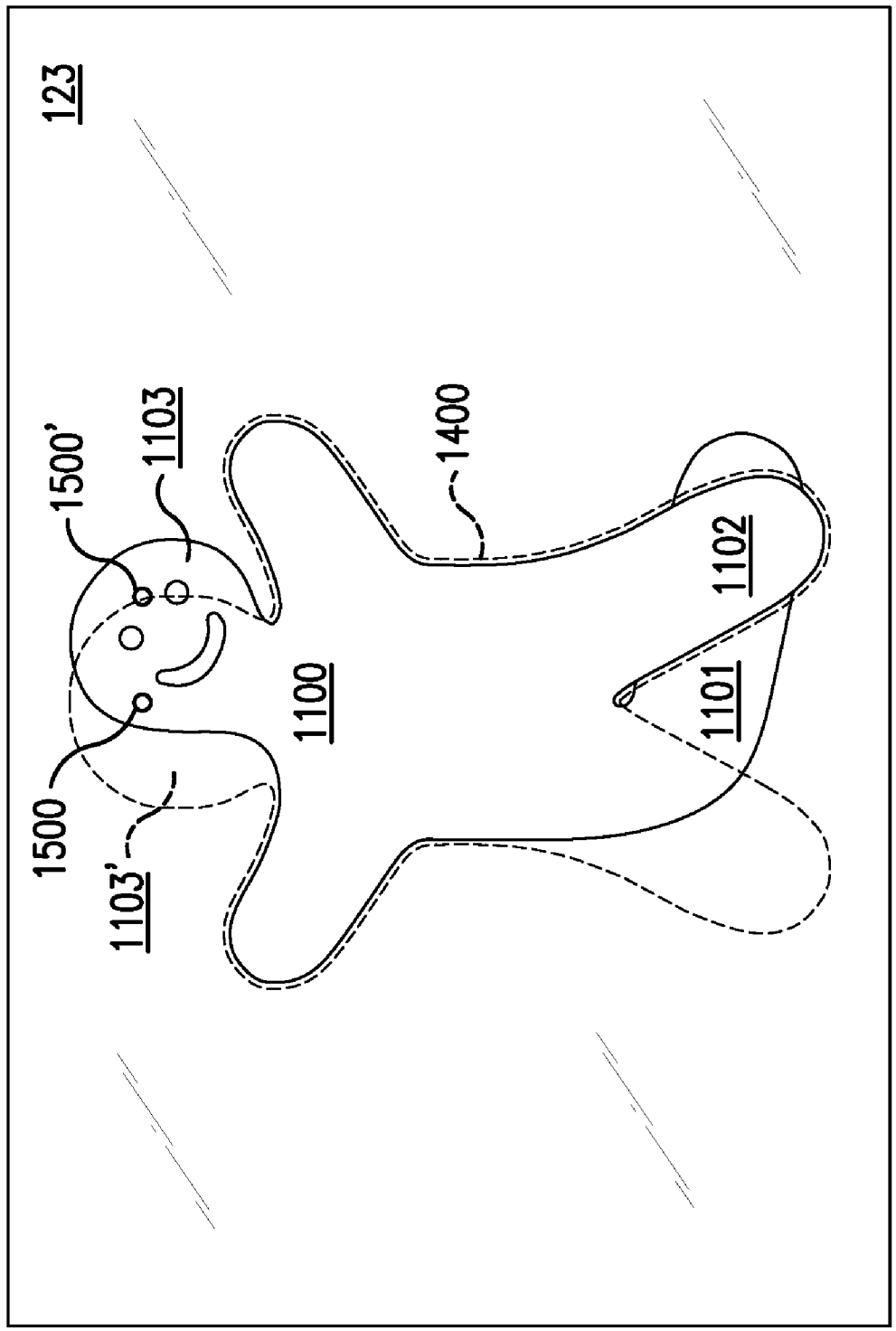
Figure 16:
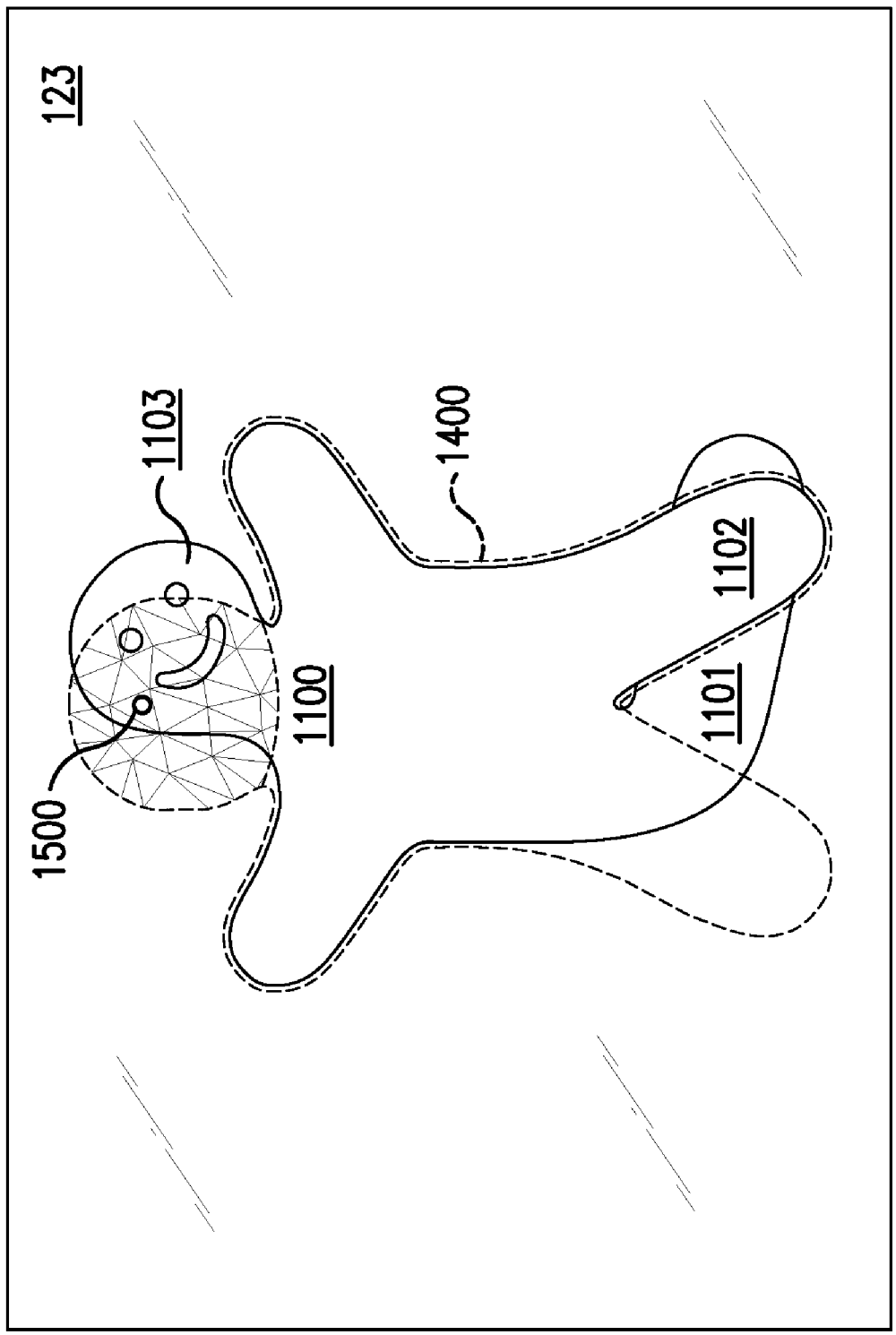

In block 206, the user may add a control point 1500 within the outline 1400 of the unmodified object as shown in FIG. 15. As can be seen, a corresponding control point 1500' is displayed on the head 1103 of the deformed gingerbread man 1103. This may provide a visual cue that the user is editing the correct location on the deformed object. However, in one embodiment, the corresponding control point 1500' is not displayed.

In block 207, the user modifies a starchiness parameter associated with the control point 1500. In the embodiment shown in FIG. 16, the user has increased the starchiness value for the starchiness parameter associated with control point 1500. In addition the user has selected an extent value such that the starchiness parameter affects substantially the entire head 1103' of the gingerbread man. By increasing the starchiness value associated with control point 1500, the gingerbread man's head 1103 may become less susceptible to the indirect deformation caused by the deformation of the right leg 1101.

In block 208, the deformed object is regenerated. In one embodiment, the application 120 executes the deformation engine 121 to deform the gingerbread man 1100 based at least in part on the deformation and the modified parameter. The deformation engine passes the deformed gingerbread man 1100 to the rendering engine, which renders the deformed gingerbread man 1100.

Figure 17:
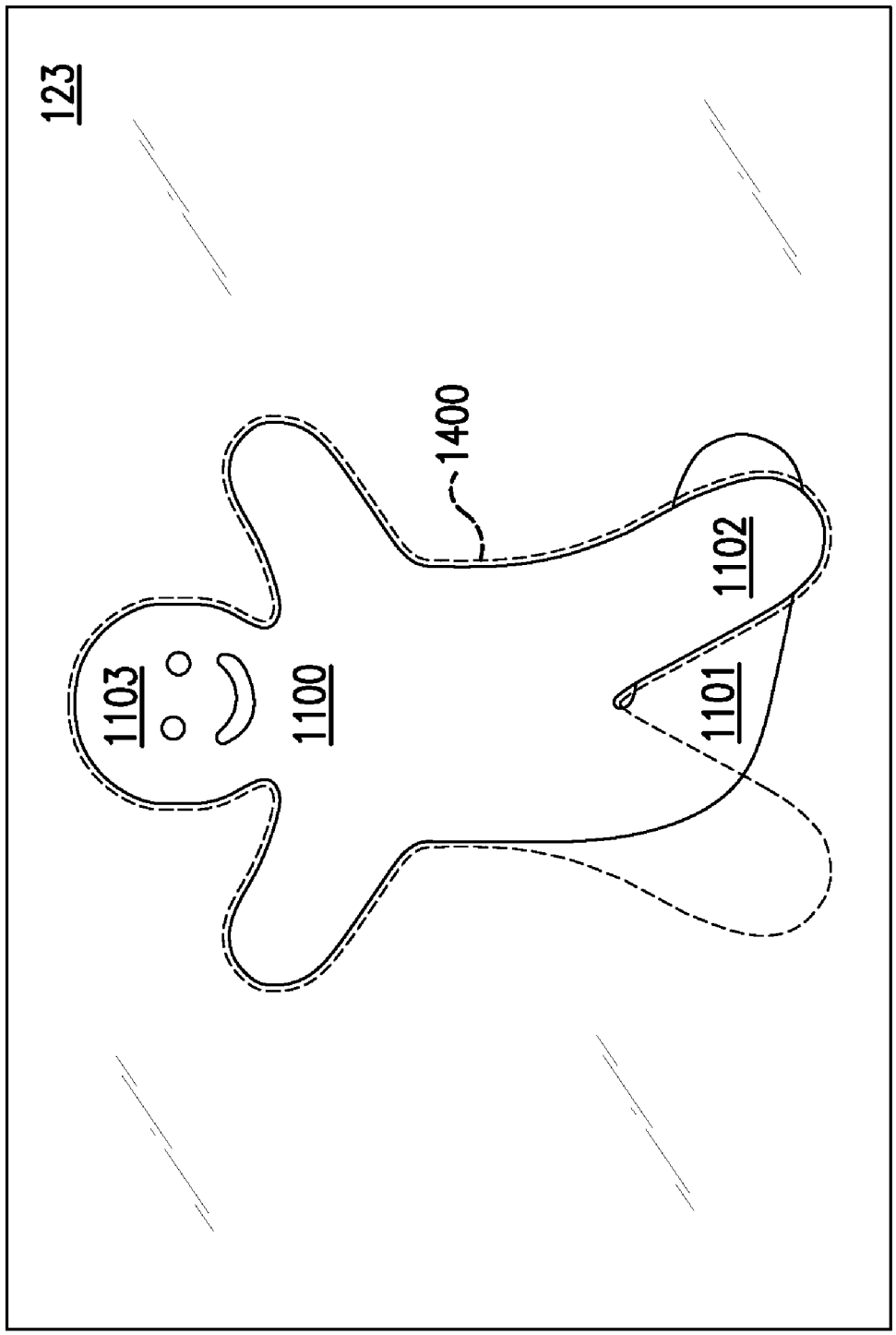
Figure 18:
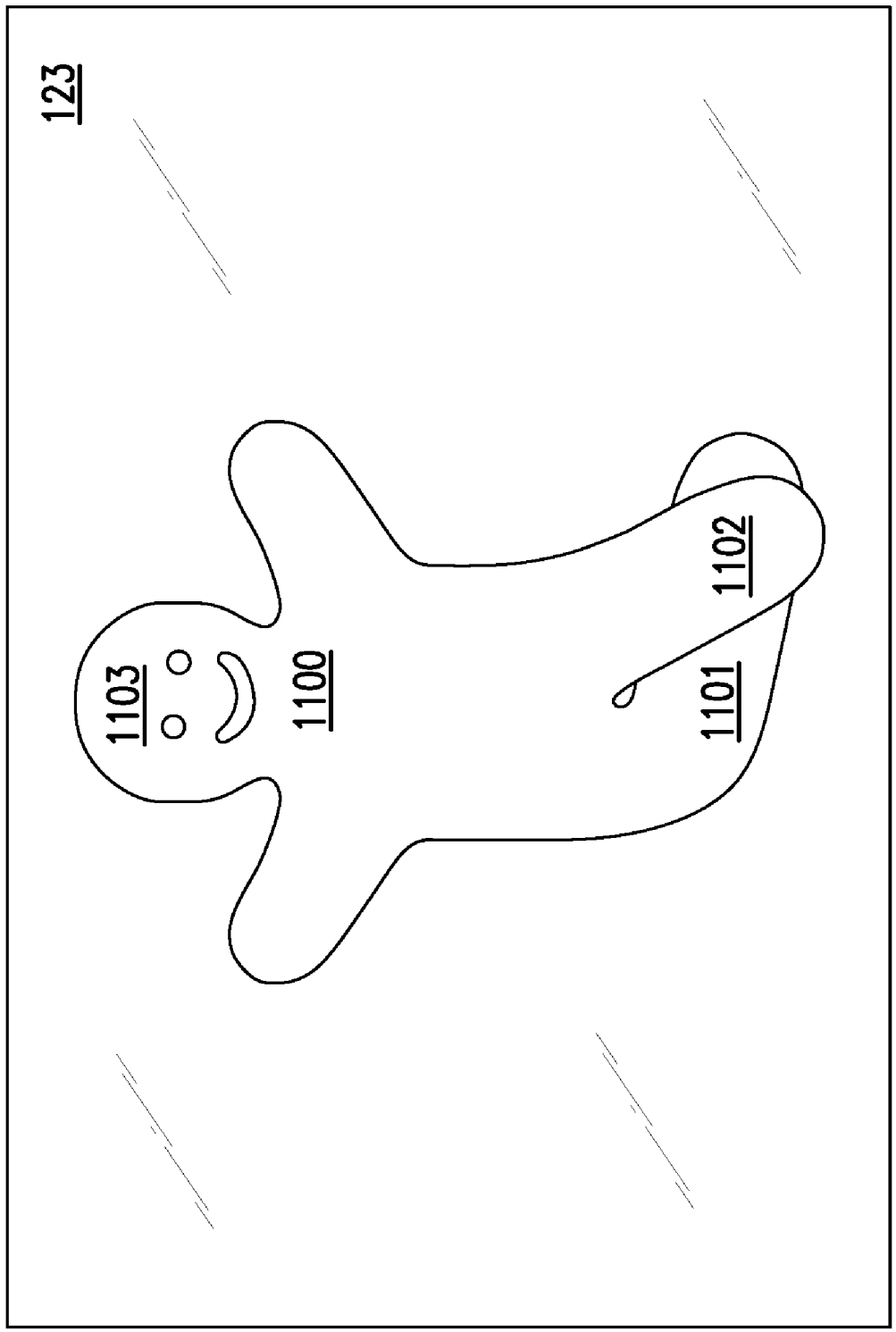

In block 209, the application 120 displays the regenerated deformed object, as can be seen in FIGS. 17 and 18. FIG. 17 shows the outline 1400 of the unmodified gingerbread man overlaid on the regenerated deformed gingerbread man 1100. As can be seen, the head 1103 of the deformed gingerbread man 1100 has not undergone the same amount of indirect deformation that can be seen in FIG. 13, and relative to the outline 1400 of the unmodified gingerbread man. FIG. 18 shows the deformed gingerbread man 1100 without the outline 1400. As can be seen, the increased starchiness value associated with the head 1103 has caused the deformation engine to substantially reduce the amount of indirect deformation propagated to the head 1103 from the deformation of the right leg 1101.

In the embodiment shown in FIGS. 13-18, the right leg 1101 is displayed behind the left leg 1101. However, a user may wish to move the right leg 1101 into the foreground. Using one embodiment of the present invention, user may add a second selected point within outline 1400 corresponding to the right leg 1101'. The user may then modify an overlap parameter associated with the second selected point to cause the right leg 1101 to be displayed in front of left leg 1102. For example, the user may use a method, such as the embodiment described with respect to FIGS. 6-10 to move the right leg 1101 into the foreground. Still further selected points may be added to outline 1400 to adjust additional parameters.

While embodiments of the present invention have been described for editing controls for two-dimensional objects, embodiments of the invention also include corresponding editing controls for three-dimensional objects. An application for editing an image may allow a user to edit three-dimensional images. For example, in one embodiment, the application displays a three-dimensional object in an editing window. A user may deform the three-dimensional object. The application may execute a deformation engine and a rendering engine to generate a deformed object based at least in part on the deformation and the unmodified object. The user may then cause the application to display an outline of the unmodified object in the editing window, and may be overlaid on the deformed object.

In a three-dimensional editing tool, an outline of an unmodified object may comprise an outline of one cross section of the unmodified object along one of the X, Y, or Z axes. In such an embodiment, a user may select one of the three separate to be displayed. In one embodiment, the outline may be a three-dimensional outline, and may be rotatable to provide different perspectives of the unmodified object. Further, the outline may comprise a partially-transparent rendered object of the unmodified object, which may allow a user to more easily adjust a perspective of the unmodified object. In one embodiment of the present invention for editing three-dimensional objects, a user may be able to view an outline of the unmodified object at varying depths. For example, a user may wish to add a control point or a selected point at a location inside the volume of the three-dimensional object. A user may be allowed to navigate into the interior of the object to add a control point or selected point.

Referring again to FIG. 1, embodiments of the present invention can be implemented in digital electronic circuitry, or in computer hardware, firmware, software, or in combinations of them. In one embodiment, a computer 101 may comprise a processor 110 or processors. The processor 110 comprises a computer-readable medium, such as a random access memory (RAM) coupled to the processor. The processor 110 executes computer-executable program instructions stored in memory 111, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A method for editing an image, comprising:
   using a processor to cause an image comprising at least one unmodified object to be displayed in a window;
   receiving, by a processor, a deformation of the unmodified object;
   using a processor to generate a deformed object based at least in part on the deformation and the unmodified object;
   using a processor to cause the deformed object to be displayed in the window;
   using a processor to cause a representation of the unmodified object to be displayed in the window with the deformed object;
   receiving, by a processor, a selection of a first point associated with the unmodified object while the representation of the unmodified object and the deformed object are displayed in the window;
   receiving, by a processor, a modification of a first parameter at the first point while the representation of the unmodified object and the deformed object are displayed in the window;
   using a processor to generate a first regenerated deformed object based at least in part on the deformation, the unmodified object, and the modification of the first parameter; and
   using a processor to cause the first regenerated deformed object to be displayed in the window.

2. The method of claim 1, wherein receiving the selection of the first point further comprises receiving a selection of the first point within the representation of the unmodified object.

3. The method of claim 1, wherein the representation comprises an outline of the unmodified object and causing a representation of the unmodified object to be displayed in the window with the deformed object further comprises overlaying the outline of the unmodified object on the deformed object.

4. The method of claim 1, wherein the first parameter comprises an overlap parameter or a starchiness parameter.

5. The method of claim 4, wherein the overlap parameter indicates which of two or more overlapping areas of the deformed object should be visible, and the starchiness parameter indicates a resistance to deforming for an area of the unmodified object.

6. The method of claim 1, wherein the first parameter comprises a magnitude and an extent.

7. The method of claim 1, further comprising using a processor to cause a graphical indication of a magnitude and an extent of the first parameter to be displayed within the representation.

8. The method of claim 1, wherein the deformation comprises at least one of a stretching or a compression of the unmodified object.

9. The method of claim 1, further comprising:
receiving, by a processor, a selection of a second point associated with the unmodified object while the representation of the unmodified object and the deformed object are displayed in the window;
receiving, by a processor, a modification of a second parameter at the second point while the representation of the unmodified object and the deformed object are displayed in the window;
using a processor to generate a second regenerated deformed object based at least in part on the unmodified object, the deformation, the modification of the first parameter, and the modification of the second parameter; and
using a processor to cause the second regenerated deformed object to be displayed in the window.

10. The method of claim 1, further comprising:
using a processor to generate a tessellated mesh associated with the object, the tessellated mesh comprising a plurality of vertices and a plurality of edges,
wherein the first point is associated with a vertex in the tessellated mesh.

11. A non-transitory computer-readable medium on which is encoded program code configured to be executed by a processor, the program code comprising:
program code to cause an image comprising at least one unmodified object to be displayed in a window;
program code to receive a deformation of the unmodified object;
program code to generate a deformed object based at least in part on the deformation and the unmodified object;
program code to cause the deformed object to be displayed in the window;
program code to cause a representation of the unmodified object to be displayed in the window with the deformed object;
program code to receive a selection of a first point associated with the unmodified object while the representation of the unmodified object and the deformed object are displayed in the window;
program code to receive a modification of a first parameter at the first point while the representation of the unmodified object and the deformed object are displayed in the window;
program code to generate a first regenerated deformed object based at least in part on the deformation, the unmodified object, and the modification of the first parameter; and
program code to cause the first regenerated deformed object to be displayed in the window.

12. The computer-readable medium of claim 11, wherein the program code to receive the selection of the first point further comprises program code to receive a selection of the first point within the representation of the unmodified object.

13. The computer-readable medium of claim 11, wherein the representation comprises an outline of the unmodified object, and the program code to cause a representation of the unmodified object to be displayed in the window with the deformed object further comprises program code to overlay the outline of the unmodified object on the deformed object.

14. The computer-readable medium of claim 11, wherein the first parameter comprises an overlap parameter or a starchiness parameter.

15. The computer-readable medium of claim 14, wherein the overlap parameter indicates which of two or more overlapping areas of the deformed object should be visible, and the starchiness parameter indicates a resistance to deforming for an area of the unmodified object.

16. The computer-readable medium of claim 11, wherein the first parameter comprises a level and an extent.

17. The computer-readable medium of claim 11, further comprising program code to cause a graphical indication of a level and an extent of the first parameter to be displayed within the representation.

18. The computer-readable medium of claim 11, wherein the deformation comprises at least one of a stretching or a compression of the unmodified object.

19. The computer-readable medium of claim 11, further comprising:
program code to receive a selection of a second point associated with the unmodified object while the representation of the unmodified object and the deformed object are displayed in the window;
program code to receive a modification of a second parameter at the second point while the representation of the unmodified object and the deformed object are displayed in the window;
program code to generate a second regenerated deformed object based at least in part on the unmodified object, the deformation, the modification of the first parameter, and the modification of the second parameter; and
program code to cause the second regenerated deformed object to be displayed in the window.

20. The computer-readable medium of claim 11, further comprising:
program code to generate a triangular mesh associated with the object, the triangular mesh comprising a plurality of vertices and a plurality of edges,
wherein the first point is associated with a vertex in the triangular mesh.

21. A system for editing an image, comprising:
a deformation engine;
a rendering engine; and
a processor in communication with the deformation engine and the rendering engine, the processor configured to:
receive an image comprising an unmodified object;
cause the image to be displayed in a window
receive a deformation to the unmodified object;
cause the deformation engine to generate a deformed object based at least in part on the unmodified object and the deformation
cause the rendering engine to render the image and the deformed object,
cause the image and the deformed object to be displayed in a window, cause a representation of the unmodified object to be displayed in the window with the deformed object;

receive a selection of a point associated with the unmodified object while the representation of the unmodified object and the deformed object are displayed in the window;

receive a modification of a first parameter at the point while the representation of the unmodified object and the deformed object are displayed in the window;

cause the deformation engine to generate a regenerated deformed object based at least in part on the deformation, the unmodified object, and the modified first parameter;

cause the rendering engine to render the regenerated deformed object, and cause the regenerated deformed object to be displayed in the window.

22. The system of claim 21, further comprising a display.

23. The system of claim 21, further comprising an input device.

24. The system of claim 21, wherein the processor is further configured to receive the selection of the first point within the representation of the unmodified object.

25. The system of claim 21, wherein the processor is further configured to cause the representation of the unmodified object to be overlaid on the deformed object.

26. The system of claim 21, wherein the first parameter comprises an overlap parameter or a starchiness parameter.

27. The system of claim 26, wherein the rendering engine is configured to render the object based at least in part on the overlap parameter.

28. The system of claim 26, wherein the deformation engine is configured to generate the deformed object based at least in part on the starchiness parameter.

* * * * *